United States Patent [19]

Lautner et al.

[11] 3,959,675

[45] May 25, 1976

[54] BOBBIN-FLANGE MOUNTED THERMAL PROTECTOR FOR ELECTRIC MOTORS

[75] Inventors: Max E. Lautner; Paul P. Vincent, both of Watertown, N.Y.

[73] Assignee: Gould Inc., Chicago, Ill.

[22] Filed: June 19, 1974

[21] Appl. No.: 480,636

[52] U.S. Cl. .............................. 310/68 C; 310/71; 310/194; 336/192; 336/198
[51] Int. Cl.² ...................................... H02K 11/00
[58] Field of Search ............ 319/68, 140 MM, 68 C, 319/71, 171, 172, 162, 163, 164, 194, 66, 89, 91, 254, 258, 259, 273; 336/198, 208, 192, 105; 318/242; 339/244; 317/15, 157.6

[56] References Cited
UNITED STATES PATENTS

| | | | |
|---|---|---|---|
| 3,127,531 | 3/1964 | Tothero | 310/68 C |
| 3,131,322 | 4/1964 | Pleiss | 310/68 C |
| 3,189,772 | 6/1965 | Wingler | 310/194 |
| 3,259,864 | 7/1966 | Marzolf | 336/198 |
| 3,438,122 | 4/1969 | Lindt | 310/71 |
| 3,553,621 | 1/1971 | Lane | 317/15 |
| 3,585,450 | 6/1971 | Lane | 317/15 |
| 3,746,289 | 7/1973 | Johnsen | 310/91 |
| 3,772,626 | 11/1973 | Russell | 310/194 |
| 3,798,504 | 3/1974 | Kreissl | 310/273 |
| 3,813,763 | 6/1974 | Church | 310/194 |
| 3,842,297 | 10/1974 | Pleiss | 310/68 C |

*Primary Examiner*—R. Skudy
*Attorney, Agent, or Firm*—Bruns & Jenney

[57] ABSTRACT

A coil bobbin for a sub-fractional horsepower motor is formed with a cavity in one flange opening outward from the flange rim, a partition dividing the cavity into two chambers. One chamber has a cross-sectional shape adapted to receive a thermal sensing device and the other has a cross-sectional shape adapted to receive an insulated terminal wire. The thermal device has a metal body as one terminal of the device and a projecting rectangular metal portion as the other terminal. One start wire of the coil is wound around or otherwise secured to the projecting terminal and the thermal device is inserted into one chamber from the open end. The partition is partially slotted and the stripped end of the lead wire is inserted in the other chamber from the other end, the stripped and bent-over end of the lead wire extending through the slot. As the thermal device is pushed into its chamber its metal body forces the stripped end against the partition and into electrical connection with the stripped end. The other start wire of the coil is adapted to be connected to another lead wire.

2 Claims, 13 Drawing Figures

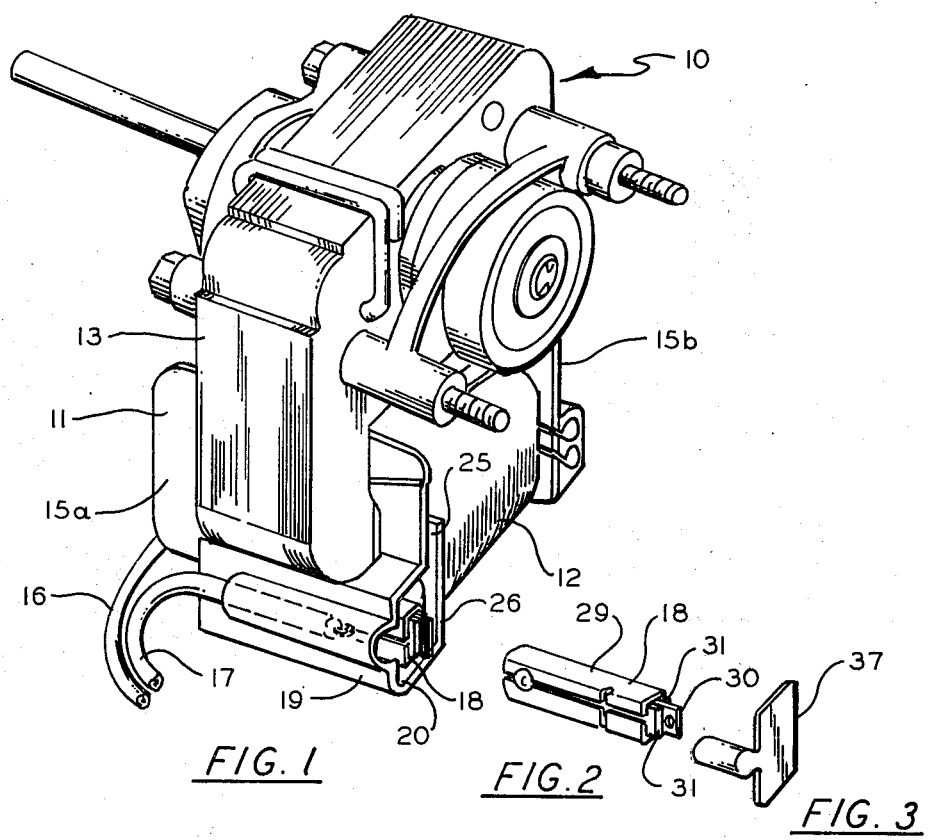
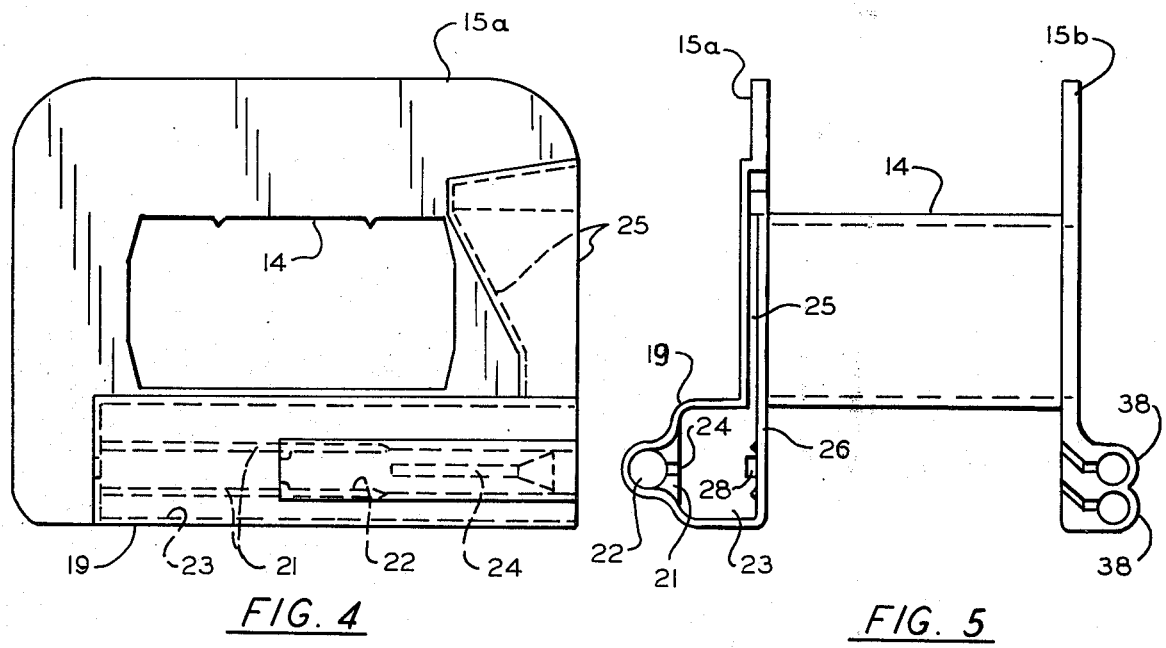

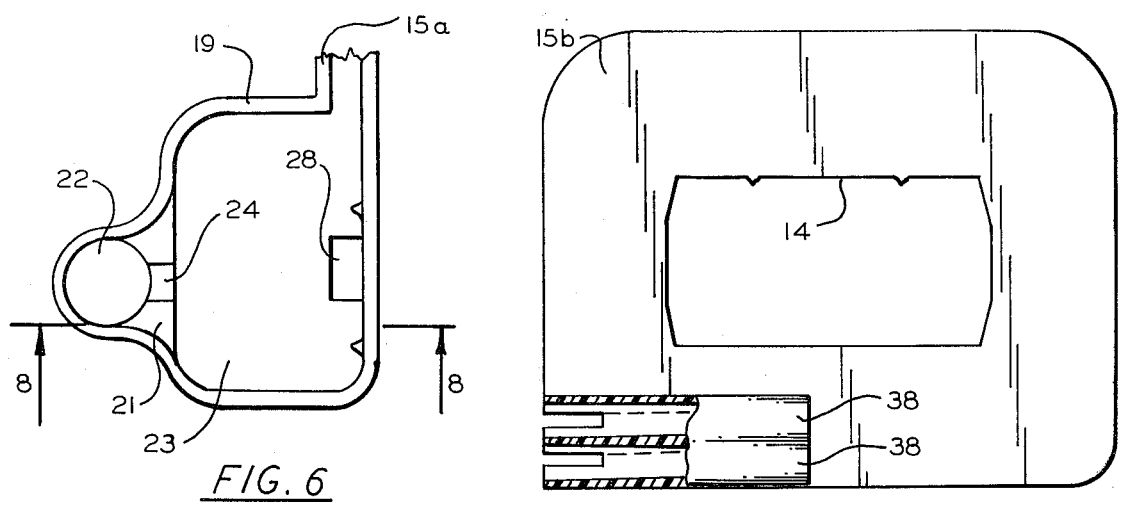
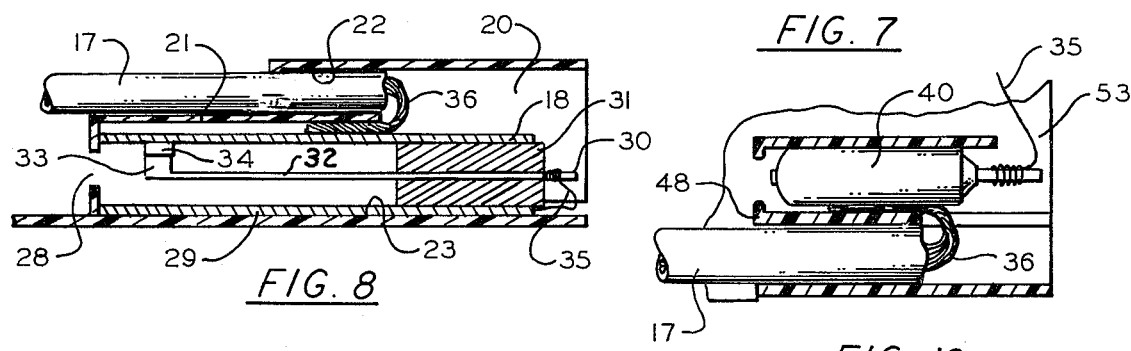
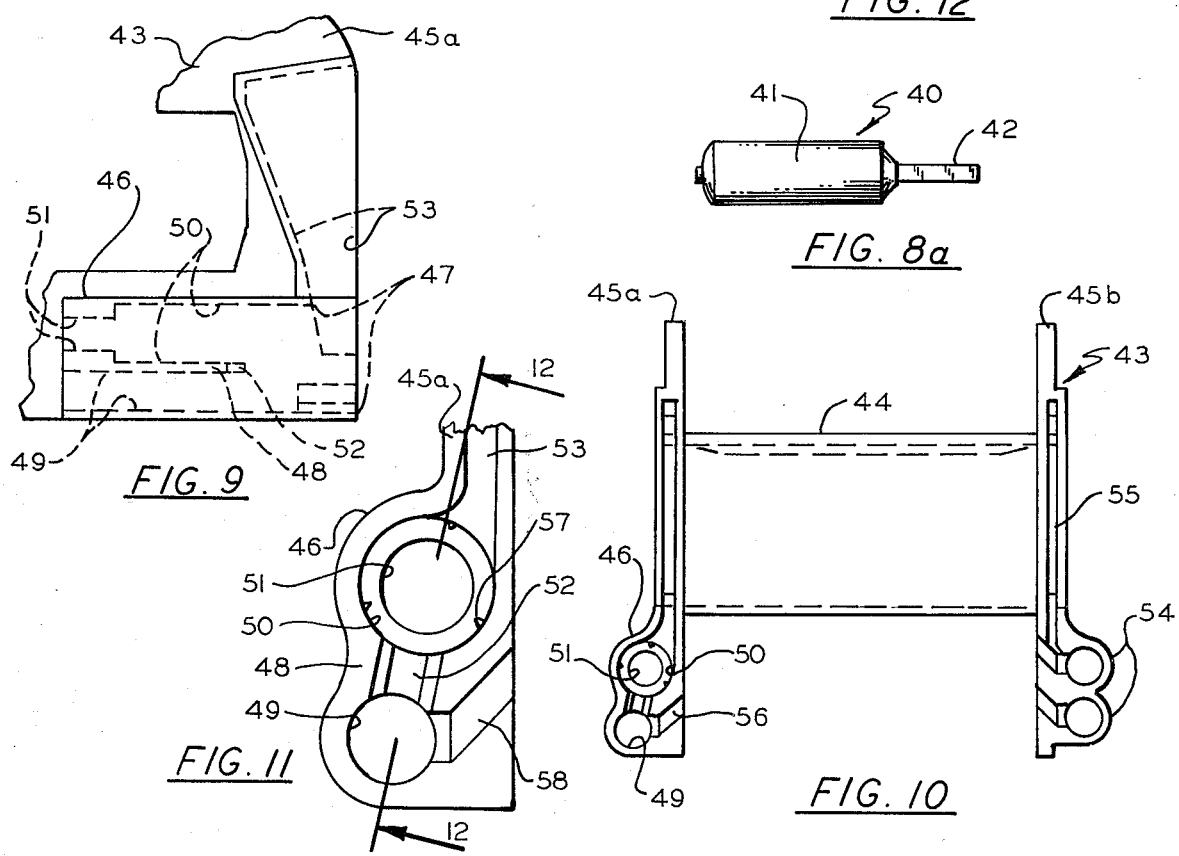

BOBBIN-FLANGE MOUNTED THERMAL PROTECTOR FOR ELECTRIC MOTORS

BACKGROUND OF THE INVENTION

This invention relates to an electric motor coil-bobbin formed with a cavity having one chamber containing a thermal sensing device and an adjacent chamber containing one end of a lead wire and means between the chambers for containing the stripped end of the lead wire in electrical contact with the thermal device.

Heretofore, most electric motors have thermal sensing devices carried in or in contact with the coil. In very small motors this results in an excessively bulky coil or injury to the fine and delicate wire of the coil winding.

In such coils heretofore known that have bobbin-flange carried thermal sensing devices, there is a multiplicity of parts making hand-assembly mandatory and difficult. In small motors the wire of the coil windings is very fine and delicate and may break when manually handled. In known bobbins having flange mounted sensing devices, the start wires to the coil must be soldered to their lead wires or to their connections to the sensing device.

SUMMARY OF THE INVENTION

This invention contemplates forming on the outer side of a coil-bobbin flange a projecting portion in which there is a cavity divided into a first chamber and a second chamber separated, at least in part, by an integral partition. The first chamber is cylindrical, conforming in cross section to an insulated lead wire which is slidingly inserted therein. The second chamber is rectangular or round in cross-sectional shape and adapted to receive therein a thermal sensing device minimally spaced from the coil winding on the bobbin.

The thermal sensing device is one of two known available types. One device is recycling and has a rectangular cross-sectional shape and the second chamber therefor is rectangular in cross-sectional shape and of such size as to closely but freely receive the device therein. The other known device is a fuse type or single-shot device and is cylindrical. The second chamber for such a device is round in cross-sectional shape and of a size to closely but freely receive the device therein.

The first chamber in either case is open at both ends and the lead wire may be inserted or worked upon at either end. The lead wire is insulated and of the multi-strand conductor type. The second chamber has an open end adjacent the rim of the flange so that the thermal sensing device may be inserted from that end. The other end of the second chamber may be closed or partially closed for retaining the device.

The thermal sensing device, whether recycling or fuse-type, has a metal body wall at one end adapted to serve as one terminal of the device. At the other end, a projecting portion which is metallic and rectangular in cross section has its corners sharpened and is adapted to serve as the other terminal of the device.

Adjacent the second chamber, the flange is slotted for the passage therethrough of a start wire of the coil winding. The partition between the first and second chambers is also slotted adjacent the open end of the cavity. This slot is adapted for the passage therethrough of the stripped end of the lead wire to the thermal sensing device.

The bobbin flange opposite to that containing the two chambers is adapted for the passage therethrough of the other start wire of the coil winding and this flange is provided with known means for securing thereto the other lead wire to the coil.

The coil start wire is first connected to the rectangular projecting terminal of the sensing device by tightly winding the enamel coated start wire therearound by known winding means. The enamel coating of the start wire is broken by the sharp corners of this terminal. This operation is adapted to be done by automatically operating means. If desired, the start wire may be secured to the terminal by soldering or welding.

The lead wire to the thermal sensing device has its end stripped and this end is bent over into a hooked configuration either before or after the lead wire end is inserted in the first chamber. The lead wire may then be positioned in the first chamber so that its hooked stripped end extends into the second chamber. For example, the lead wire may be first inserted and then withdrawn just far enough for the stripped end to lie in the partition slot with a portion extending into the second chamber.

The thermal sensing device is then inserted in the second chamber, body end first, from the open end of the chamber. The sensing device is then forced down into the second chamber, squashing the metal body terminal of the device against the stripped end of lead wire between the body and the partition and chamber walls, thus securing the stripped end of the lead wire in the first chamber and securing the stripped end in good electrical contact with the body terminal of the device.

The second chamber and cavity open end is of sufficient length to contain the entire thermal sensing device including the projecting rectangular terminal and its wrapped-around start wire portion. This end of the sensing device may then be coated with wax or other material to protect the electrical connection at this end from corrosion. A cover may also be provided for the open end of the cavity.

BRIEF DESCRIPTION OF THE DRAWINGS

FIG. 1 is a perspective view of a sub-fractional horsepower electric motor having a coil-bobbin according to the invention;

FIG. 2 is a perspective view of a recycling thermal sensing device shown in FIG. 1;

FIG. 3 is a perspective view of a cover for the bobbin flange cavity;

FIG. 4 is an enlarged end elevational view of the coil-bobbin of FIG. 1 as viewed from the left in FIG. 5;

FIG. 5 is a side elevational view thereof;

FIG. 6 is a further enlarged fragmentary view of a portion of one of the bobbin flanges;

FIG. 7 is an end elevational view of the bobbin as viewed from the right in FIG. 5;

FIG. 8 is a cross-sectional view on a reduced scale and on the line 8—8 of FIG. 6;

FIG. 8a is a side elevational view of a modified form of thermal sensing device;

FIG. 9 is a greatly enlarged fragmentary view of a portion of a modified form of coil-bobbin as viewed from the left in FIG. 10;

FIG. 10 is a side elevational view on a reduced scale of the modified form of bobbin fragmentarily shown in FIG. 9;

FIG. 11 is a greatly enlarged fragmentary view of a portion of the bobbin shown in FIG. 10; and FIG. 12 is a sectional view on a reduced scale and on the line 12—12 of FIG. 11.

DESCRIPTION OF THE PREFERRED EMBODIMENTS

Referring to FIG. 1, a sub-fractional horsepower electric motor 10 has a bobbin 11 on which a coil 12 of fine enameled wire is wound surrounding a portion of the stator member 13. Bobbin 11, shown in FIGS. 4 and 5, is formed of nylon or other material having good electrical insulating properties and has a hollow spool portion 14 and end flanges 15a and 15b.

Two lead wires 16 and 17 are insulated and of the multistrand conductor type and are electrically connected for supplying current to the coil windings at 12. Lead wire 16 is connected, by means not shown, to one start wire of the coil and lead wire 17 is connected, as hereinafter described, through a thermal sensing device 18, shown in FIG. 2, to the other start wire of the coil.

The flange 15a is thickened outward of the coil at 19 to provide a cavity 20 in the flange, best seen in FIG. 1. Cavity 20 is open at its end at the rim of the flange and, spaced from this end, the cavity is divided by an integral partition 21, best seen in FIGS. 5 and 6, into two chambers 22 and 23.

Chamber 22 is round in cross section and adapted to slidingly receive the stripped end of lead wire 17. Chamber 23 is substantially rectangular in cross section for receiving the thermal sensing device 18 which is rectangular in cross section.

It will be noted that partition 21 is longitudinally slotted at 24 adjacent the open end of cavity 20 and a slot 25 is provided along flange 15a leading from chamber 23 to the outer surface of spool 14.

As best seen in FIG. 5, the sidewall of chamber 23 at 26 is thin so that the sensing device 18 is close to the coil winding 12 on spool 14.

The end of chamber 22 opposite the open end of cavity 20 is open for the admission of lead wire 17. The corresponding end of chamber 23 is closed to prevent loss of the device 18 but it has an opening 28, best seen in FIG. 6, provided for the entry of an ejection pin, which is useful if color coding of the device 18 is desired.

The thermal sensing device 18 is commercially available and has a metal body wall 29 serving as one terminal of the device and a projecting metal portion 30, serving as the other terminal, separated by insulators 31, as seen in FIG. 1. As seen in FIG. 8, the terminal 30 forms one end of a bimetal arm 32 carrying contact 33, the other contact 34 being carried on the wall 29, as is usual with this type of device. The terminal 30 is rectangular in cross section, the corners being sharp.

In assembling the device 18 in chamber 23, the start wire 35 of the coil winding 12 is wrapped around terminal 30 several turns as shown in FIG. 8. This may be done by automatically operating winding means. If desired, the winding may be secured to terminal 30 by soldering or welding.

The stripped end 36 of lead wire 17 is inserted in chamber 22, and the stripped portion 36 is led through groove 24 into chamber 23. This may be done by inserting lead wire 17 through the constricted end of chamber 22, as shown in FIG. 8, until the stripped end 36 is accessible from the open end of cavity 20. The end 36 is bent over hook shaped and wire 17 then drawn back again until the end 36 lies in groove 24 and chamber 23.

Device 18 is then pushed into the chamber 23 squeezing the stripped end 36 between partition 21 and the device body wall 29. This forms a good electrical contact between the end 36 and wall 29 and locks the lead wire 17 in chamber 22.

The hooking of the stripped end 36 and the pushing of device 18 into the chamber 23 may also be performed by automatically operated machinery.

Terminal 30 of the device then may be covered with melted wax for preventing corrosion and a cover 37 such as shown in FIG. 3 may be assembled to cover the open end of cavity 20.

As best seen in FIG. 7, the other coil flange 15b may be provided with tubular projections 38—38 for connecting one or more start wires to lead wires to the coil and securing them in place as described in U.S. Pat. No. 3,259,864, issued July 5, 1966, to Marzolf and Lautner.

Referring to FIG. 8a another known type of thermal sensing device is shown at 40. This is a fuse type device, a portion of which is adapted to melt when subjected to heat exceeding a predetermined temperature. The device has a tubular body wall 41 of metal forming one terminal and having another rod-like terminal 42 projecting from one end of the device, terminal 42 being squared by a forming operation so as to have sharp corners.

Referring to FIGS. 9–12, a coil bobbin 43 is formed of material similar to that of bobbin 11. As shown in FIG. 10, bobbin 43 has a spool portion 44 in which the fine wire coil is wound and flanges 45a and 45b.

Flange 45a is enlarged at 46 for forming a cavity 47 (FIG. 9) therein open at the end extending toward the rim of the flange. Intermediate this end and the other end of the enlargement 46 the cavity is divided by a partition 48 into a first chamber 49 and a second chamber 50.

Both chambers are circular in cross section, chamber 49 being of a size to contain a lead wire such as at 17 in FIG. 1, and chamber 50 being of a size and cross-sectional shape to contain the thermal sensing device 40. Both chambers are openn at their ends opposite to the open end of cavity 47, the chamber 50 being partially closed by an annular constriction at 51, FIG. 9.

It will be noted that the end of partition 48 toward the open end of cavity 47 is slotted at 52 adapting it for the passage therethrough of a stripped end 36 of a lead wire 17 and flange 45a is provided therealong with a slot 53, like slot 25 in bobbin 11, and opening into chamber 50.

Flange 45b is provided with two tubular projections 54 like the projections 38 of bobbin 11. It will be noted flange 45b has a slot 55 like the slot 53 in flange 45a and chamber 49 is provided with a slot 56 toward the area for the coil windings. Slots 55 and 56 and projections 54 make the bobbin adaptable not only for one and two stage windings but also for other variations in winding, when desired.

The attachment of the terminals of thermal sensor 40 are similar to those for the sensor 18. A coil start wire is wrapped around the terminal 42 by a winding machine, or the start wire may be secured to the terminal by soldering or welding, and a lead wire inserted in chamber 49 with its stripped end extending through slot 52 into the chamber 50.

When the sensing device 40 is forced into chamber 50, the stripped end of wire 17 is squashed against the sides of chamber 50 and against partition 48 as shown diagrammatically in FIG. 12, for electrically connecting the stripped end with body wall 41 of the device and for securing the lead wire in chamber 49.

It will be noted that small longitudinally extending ribs may be provided on the walls of chamber 50, as shown at 57 in FIG. 11, for providing a snug fit of the device 40 in chamber 50 and for resisting too wide a spreading of the wire strands of the stripped end 36.

We claim:

1. An electromagnetic coil for a small electric motor, comprising: a spool type bobbin of electrical insulating material having a tubular portion adapted to receive a metal core therein and flanges at either end extending radially outward, at least two insulated lead wires adapted to be connected to a source of electricity, a coil of enameled wire wound around the bobbin between the flanges and having two end wires, the flanges being slotted and the end wires projecting through the flange slots from the coil to the flange exterior surface, and a thermal sensing device having a metal body wall around one end of the device electrically connected as one terminal of the device, the other end of the device having a metal member projecting therefrom and being electrically connected as the other terminal of the device, one flange being formed with an integral enlargement having a cavity opening edgewise of the flange and extending along the outer suface of the flange, the cavity being divided along a portion of its length into a first chamber and a second chamber by an integral partition having a slot therethrough in its end adjacent the cavity open end, the first chamber having a cross-sectional configuration for closely receiving the end of a lead wire therein and the second chamber having a cross-sectional configuration for closely receiving the metal body wall of the device, one coil end being secured to and in electrical contact with the device projecting member, a first lead wire end lying in the first chamber and having a stripped portion extending through the partition slot and into the second chamber compressed between the device body wall therein and the partition for securing the first lead wire in the first chamber and for securing the first lead wire stripped portion in electrical contact with the device body wall, the second lead wire being secured to one of the bobbin flanges and electrically connected to the other coil end wire.

2. An electromagnetic coil for a small electric motor, comprising: a spool-type bobbin of electrical insulating material having a tubular portion adapted to receive a metal core therein, the bobbin having flanges at either end extending radially outward from the tubular portion, at least two insulated multistrand lead wires adapted to be connected to a source of electricity, a coil of enameled wire wound around the bobbin between the flanges and having two end wires, the flanges being slotted and the end wires projecting through the flange slots from the coil substantially to the flange exterior surface, and a thermal sensing device having a metal body wall around one end of the device electrically connected in the device as one terminal thereof, the other end of the device having a metal member rectangular in cross section and having sharp edges projecting endwise therefrom and being electrically connected in the device as the other terminal thereof, one flange being formed with an integral enlargement having a cavity opening edgewise of the flange and extending along the outer surface of the flange, the cavity being divided along a portion spaced from the cavity open end into a first chamber and a second chamber by an integral partition having a slot therethrough at its end adjacent the cavity open end, the first chamber being open ended and having a cross-sectional shape for receiving the end of a lead wire therein, the second chamber having an at least partially closed end remote from the open end of the cavity and having a cross-sectional configuration for closely receiving the metal body wall of the device therein and being separated from the coil by a relatively thin portion of the flange, one coil end being tightly wound with a plurality of turns around the device endwise projecting member for electrical connection thereto, the projecting member lying in the second chamber end adjacent the cavity opening, a first lead wire end lying in the first chamber and having a stripped portion extending through the partition slot and extending into the second chamber adjacent its partially closed end compressed between the device body wall therein and the partition for securing the first lead wire in the first chamber and for securing the first lead wire stripped portion in electrical contact with the device body wall, the second lead wire being secured to the other bobbin flange and electrically connected to the other coil end wire.

* * * * *